United States Patent
Matsushima et al.

(10) Patent No.: US 11,007,882 B2
(45) Date of Patent: May 18, 2021

(54) SADDLE-TYPE ELECTRIC VEHICLE

(71) Applicants: HONDA MOTOR CO., LTD., Tokyo (JP); M-TEC Co., Ltd., Asaka (JP)

(72) Inventors: Satoshi Matsushima, Wako (JP); Tsukasa Kimura, Wako (JP); Makoto Mitsukawa, Wako (JP); Kunio Yoshimi, Asaka (JP); Yoshiki Kasaya, Asaka (JP); Shinichiro Nakazawa, Asaka (JP); Kazuma Deguchi, Asaka (JP)

(73) Assignees: HONDA MOTOR CO., LTD., Tokyo (JP); M-TEC Co., Ltd., Asaka (JP)

( * ) Notice: Subject to any disclaimer, the term of this patent is extended or adjusted under 35 U.S.C. 154(b) by 10 days.

(21) Appl. No.: 16/665,035

(22) Filed: Oct. 28, 2019

(65) Prior Publication Data

US 2020/0130515 A1 Apr. 30, 2020

(30) Foreign Application Priority Data

Oct. 30, 2018 (JP) .............................. JP2018-204324

(51) Int. Cl.
*B60K 1/04* (2019.01)
*B60L 50/50* (2019.01)
(Continued)

(52) U.S. Cl.
CPC ................ *B60L 50/50* (2019.02); *B60K 1/04* (2013.01); *B60K 7/0007* (2013.01);
(Continued)

(58) Field of Classification Search
CPC .................................. B60K 1/04; B60K 7/007
See application file for complete search history.

(56) References Cited

U.S. PATENT DOCUMENTS 6,109,383 A * 8/2000 Matsuto ................... B62M 7/12
180/220
6,158,543 A * 12/2000 Matsuto ................. B60K 6/383
180/220
(Continued)

FOREIGN PATENT DOCUMENTS

CN 1390718 1/2003
CN 102762440 10/2012
(Continued)

OTHER PUBLICATIONS

Indian Office Action for Indian Patent Application No. 201944043672 dated Jul. 31, 2020.
(Continued)

*Primary Examiner* — John D Walters
*Assistant Examiner* — James J Triggs
(74) *Attorney, Agent, or Firm* — Amin, Turocy & Watson, LLP (57) ABSTRACT

An electric bicycle includes a battery, a high voltage electric wire extending from the battery, a motor driven by electricity supplied from the battery, and a reduction gear configured to reduce a speed of output of the motor. The battery is disposed in front of and above the motor. The reduction gear is disposed outside the motor in a vehicle width direction. The high voltage electric wire is disposed in a gap between the reduction gear and the battery in a forward/rearward direction at outer side of the motor in the vehicle width direction.

5 Claims, 5 Drawing Sheets (51) Int. Cl.
  *B60K 7/00* (2006.01)
  *B60K 1/00* (2006.01)
  *H02K 11/33* (2016.01)

(52) U.S. Cl.
  CPC ..... *B60K 2001/006* (2013.01); *B60L 2200/12* (2013.01); *B62K 2204/00* (2013.01); *H02K 11/33* (2016.01)

(56) References Cited

U.S. PATENT DOCUMENTS

| | | | | |
|---|---|---|---|---|
| 6,276,481 | B1* | 8/2001 | Matsuto | B60L 50/16 180/220 |
| 7,931,110 | B2* | 4/2011 | Nishiura | B62M 7/12 180/220 |
| 8,002,067 | B2* | 8/2011 | Nishiura | B62K 25/283 180/220 |
| 8,443,926 | B2* | 5/2013 | Kanno | B60L 3/0046 180/220 |
| 8,547,218 | B2* | 10/2013 | Tamaki | B60Q 5/008 340/466 |
| 8,702,549 | B2* | 4/2014 | Yoshino | B62M 7/12 475/149 |
| 8,746,392 | B2* | 6/2014 | Nomura | B62M 23/02 180/220 |
| 9,067,615 | B2* | 6/2015 | Kashiwai | F16D 65/10 |
| 9,308,829 | B2 | 4/2016 | Yoshimoto | |
| 9,415,691 | B2* | 8/2016 | Murakami | B60L 7/18 |
| 2012/0111651 | A1 | 5/2012 | Irie et al. | |
| 2017/0088013 | A1 | 3/2017 | Shimizu et al. | |

FOREIGN PATENT DOCUMENTS

| | | |
|---|---|---|
| CN | 103237717 | 8/2013 |
| CN | 104853979 | 8/2015 |
| CN | 106379453 | 2/2017 |
| JP | 2012-096594 | 5/2012 |
| JP | 2018-044629 | 3/2018 |

OTHER PUBLICATIONS

Chinese Office Action for Chinese Patent Application No. 201911035028.8 dated Jan. 19, 2021.

* cited by examiner

SADDLE-TYPE ELECTRIC VEHICLE

CROSS-REFERENCE TO RELATED APPLICATION

Priority is claimed on Japanese Patent Application No. 2018-204324, filed Oct. 30, 2018, the content of which is incorporated herein by reference.

BACKGROUND OF THE INVENTION

Field of the Invention

The present invention relates to a saddle-type electric vehicle.

Description of Related Art

As a saddle-type electric vehicle, a configuration including a battery and a motor driven by supplying power from the battery is known (for example, see Japanese Unexamined Patent Application, First Publication No. 2012-96594). Japanese Unexamined Patent Application, First Publication No. 2012-96594 discloses an electric motorcycle including a power unit assembly in which batteries are disposed in front of and above an electric motor and the electric motor and batteries are accommodated in a case.

SUMMARY OF THE INVENTION

Incidentally, high voltage electric wires connected to an inverter extend from batteries. The high voltage electric wires are formed to be relatively thick to allow a large current to flow therethrough. For this reason, in order to make a vehicle compact, it is necessary to optimize the disposition of the high voltage electric wires while maintaining the protective performance with respect to the high voltage electric wires. However, Japanese Unexamined Patent Application, First Publication No. 2012-96594 does not clearly disclose high voltage electric wires.

An aspect of the present invention is directed to providing a saddle-type electric vehicle in which protection of a high voltage electric wire and reduction in size of the vehicle are achieved.

(1) A saddle-type electric vehicle according to an aspect of the present invention includes a battery; a high voltage electric wire extending from the battery; a motor driven by electricity supplied from the battery; and a reduction gear configured to reduce a speed of an output of the motor, wherein the battery is disposed in front of and above the motor, the reduction gear is disposed outside the motor in a vehicle width direction, and the high voltage electric wire is disposed in a gap between the reduction gear and the battery in a forward/rearward direction at outer side of the motor in the vehicle width direction.

According to the aspect of the above-mentioned (1) of the present invention, since the high voltage electric wire is disposed in the gap between the reduction gear and the battery, which is a dead space, reduction in size of the vehicle can be achieved. In addition, since the high voltage electric wire is disposed to be sandwiched between the reduction gear and the battery, it is possible to protect the high voltage electric wire from flying stone or the like due to the reduction gear and the battery. Accordingly, it is possible to provide the saddle-type electric vehicle in which protection of the high voltage electric wire and reduction in size of the vehicle are achieved.

(2) The saddle-type electric vehicle according to the aspect of the above-mentioned (1) may include a case configured to cover the high voltage electric wire, wherein an outer end of the case in the vehicle width direction may be disposed inward in the vehicle width direction than an outer end of the reduction gear in the vehicle width direction.

According to the aspect of the above-mentioned (2) of the present invention, it is possible to cause the reduction gear to come into contact with a body that approaches the case from an outward side in the vehicle width direction prior to the case. For example, when the vehicle falls or the like, the reduction gear comes into contact with the ground surface prior to the case. Accordingly, it is possible to improve a protective performance of the high voltage electric wire which is covered with the case.

(3) The saddle-type electric vehicle of the above-mentioned (1) or (2) may further include an inverter configured to convert current supplied from the battery into alternating current and to supply the alternating current to the motor, wherein the inverter may be disposed below the motor, and the high voltage electric wire may be disposed to be oriented in a substantially upward/downward direction and may be connected to the inverter.

According to the aspect of the above-mentioned (3) of the present invention, at the outer side of the motor in the vehicle width direction, the high voltage electric wire can be disposed toward the inverter below the motor outward without bypassing. Accordingly, in comparison with the case in which the high voltage electric wire is disposed to be oriented in the horizontal direction at the outer side of the motor in the vehicle width direction, the high voltage electric wire can be provided to have a short length and reduction in size of the vehicle can be achieved.

(4) In the saddle-type electric vehicle according to any one of the above-mentioned (1) to (3), the high voltage electric wire may include a first high voltage electric wire and a second high voltage electric wire, and at least parts of the first high voltage electric wire and the second high voltage electric wire may overlap each other when seen from the vehicle width direction in the gap between the reduction gear and the battery in the forward/rearward direction.

According to the aspect of the above-mentioned (4) of the present invention, even when the gap between the reduction gear and the battery in the forward/rearward direction is narrow, the high voltage electric wire can be disposed in the gap between the reduction gear and the battery. Accordingly, reduction in size of the vehicle can be achieved.

(5) The saddle-type electric vehicle according to any one of the above-mentioned (1) to (4) may include a case configured to cover the high voltage electric wire, wherein the high voltage electric wire may be disposed above a brake pedal when seen from the vehicle width direction, and an outer end of the case in the vehicle width direction may be disposed inward in the vehicle width direction than the brake pedal.

According to the aspect of the above-mentioned (5) of the present invention, it is possible to cause the brake pedal to come into contact with a body that approaches the case from an outward side in the vehicle width direction prior to the case. For example, when the vehicle falls or the like, the brake pedal comes into contact with the ground surface prior to the case. Accordingly, it is possible to improve the protective performance of the high voltage electric wire which is covered with the case.

According to the aspect of the present invention, it is possible to provide a saddle-type electric vehicle in which protection of the high voltage electric wire and reduction in size of the vehicle are achieved.

DETAILED DESCRIPTION OF THE INVENTION

Hereinafter, an embodiment of the present invention will be described with reference to the accompanying drawings. Further, directions of forward, rearward, upward, downward, leftward, rightward, and so on, in the following description are the same as directions in a vehicle described below. That is, an upward/downward direction coincides with a vertical direction and a leftward/rightward direction coincides with a vehicle width direction. In a vehicle width direction, a direction away from a vehicle width center is referred to as an outward direction in the vehicle width direction. In addition, in the drawings used in the following description, an arrow UP indicates an upward direction with respect to a vehicle, an arrow FR indicates a forward direction with respect to the vehicle and an arrow LH indicates a leftward direction with respect to the vehicle.

Figure 1:
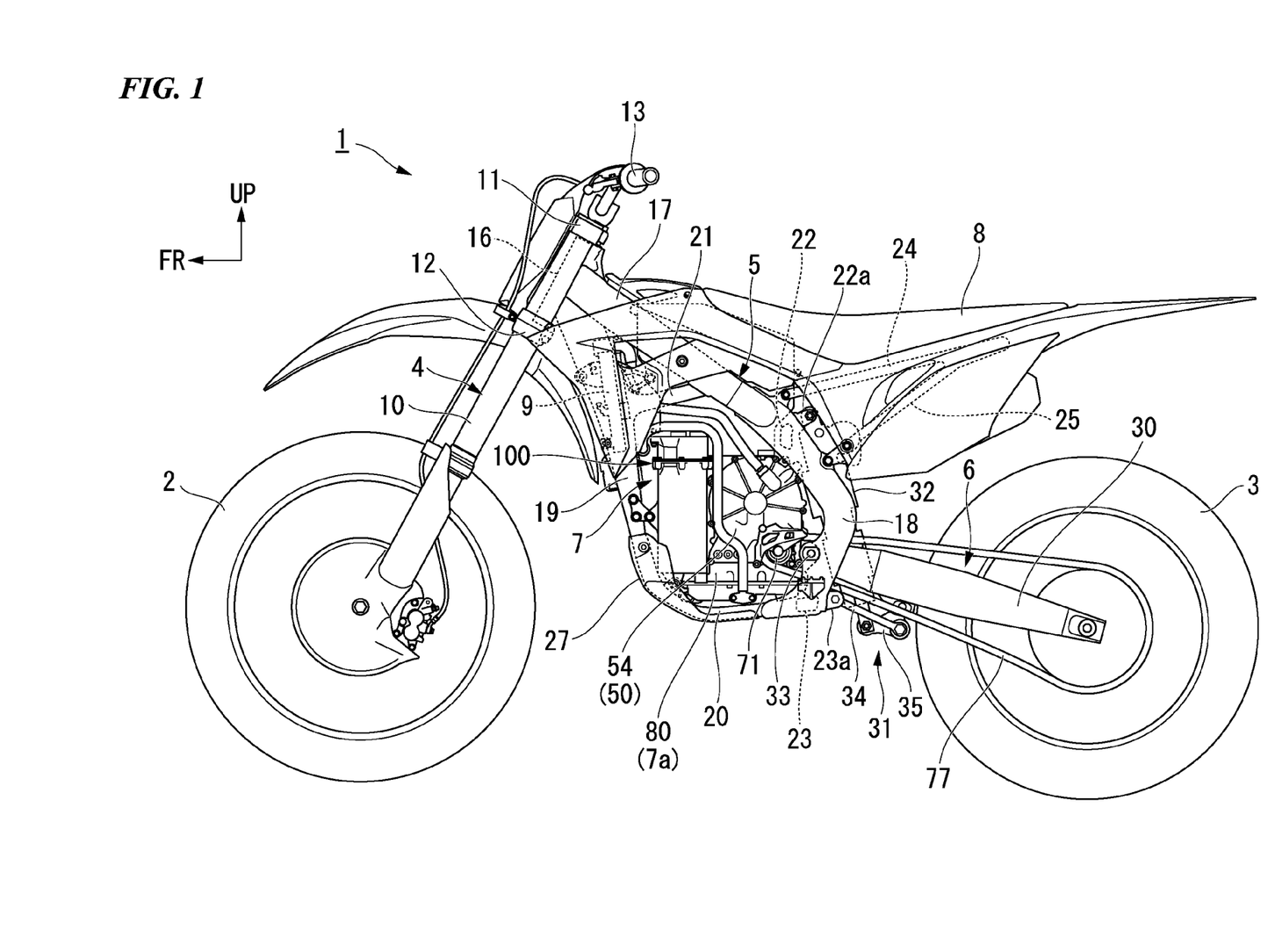
FIG. 1 is a left side view of an electric bicycle of an embodiment.

FIG. 1 is a left side view of an electric bicycle of the embodiment.

As shown in FIG. 1, an electric bicycle 1 of the embodiment is an offroad type saddle-type electric vehicle. The electric bicycle 1 includes a front wheel 2, a rear wheel 3, a front wheel suspension system 4, a vehicle body frame 5, a rear wheel suspension system 6, a power unit 7 and a seat 8.

The front wheel suspension system 4 includes a pair of left and right front forks 10 configured to axially support the front wheel 2 on lower end portions thereof, a top bridge 11 and a bottom bridge 12 provided to cross upper sections of the pair of front forks 10, a steering stem (not shown) provided to cross the top bridge 11 and the bottom bridge 12 and inserted through a head pipe 16, and a steering handle 13 supported on the top bridge 11. The front wheel 2 is steerably supported by the head pipe 16 of the vehicle body frame 5 via the front wheel suspension system 4.

The vehicle body frame 5 includes the head pipe 16, a pair of left and right main frames 17, a pair of left and right pivot frames 18, a single down frame 19, a pair of left and right lower frames 20, a pair of left and right gussets 21, a cross member 22 and a lower cross member 23, which are integrally coupled to each other through welding or the like.

The head pipe 16 is provided on a front end of the vehicle body frame 5. The head pipe 16 supports a steering stem. The pair of main frames 17 extend rearward and downward from an upper section of the head pipe 16 to branch off leftward and rightward. The pair of main frames 17 extend to be curved to protrude outward in a vehicle width direction behind the head pipe 16 in a plan view seen from above. The pair of pivot frames 18 extend downward from rear end portions of the main frames 17, respectively. A pivot shaft 33 extending in the vehicle width direction bridges between lower sections of the pair of pivot frames 18. The down frame 19 extends downward from a lower section of the head pipe 16. A radiator 9 is attached to the down frame 19. The pair of lower frames 20 extends rearward from a lower end portion of the down frame 19 to branch off leftward and rightward, and is connected to lower end portions of the pivot frames 18, respectively.

Figure 2:
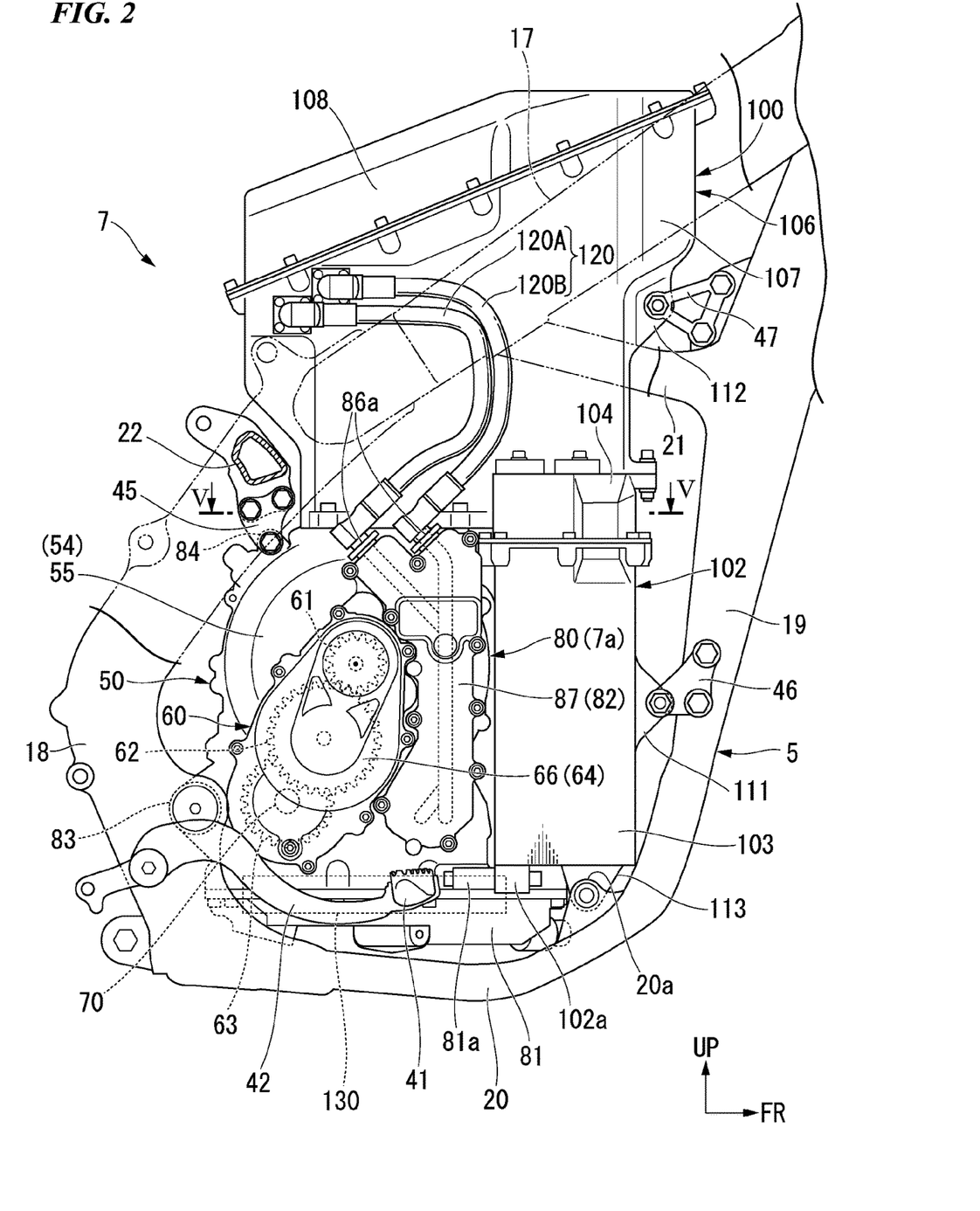
FIG. 2 is an enlarged right side view of a part of the electric bicycle of the embodiment.

FIG. 2 is an enlarged right side view showing a part of the electric bicycle of the embodiment.

As shown in FIG. 2, a pedal arm 42 having a brake pedal 41 on its tip is pivotably attached to a lower end of the pivot frame 18 on the right side. The pedal arm 42 extends forward from a shaft support section above the lower frames 20 when seen in the vehicle width direction. The brake pedal 41 is provided on a front end of the pedal arm 42, and a driver uses the brake pedal 41 for a brake operation of the rear wheel 3.

As shown in FIG. 1, the pair of gussets 21 connect the main frames 17 and the down frame 19 above a motor 50 of the power unit 7. The pair of gussets 21 extend rearward from an upper section of the down frame 19 to branch off leftward and rightward, respectively, and are connected to lower sections of the main frames 17. The cross member 22 extends in the vehicle width direction, and connects upper sections of the pair of pivot frames 18. A cushion support bracket 22a extending rearward and upward is fixed to a central section of the cross member 22 in the vehicle width direction. A rear cushion 32 (to be described below) is connected to the cushion support bracket 22a. The lower cross member 23 extends in the vehicle width direction, and connects lower end portions of the pair of pivot frames 18 below the pivot shaft 33. A link support bracket 23a extending rearward is fixed to the lower cross member 23. A link arm 34 (to be described below) is connected to the link support bracket 23a.

The vehicle body frame 5 further includes a pair of left and right seat rails 24 and a pair of left and right support rails 25. The pair of seat rails 24 are connected to upper end portions of the pivot frames 18, respectively, and extend rearward and upward from the pivot frames 18. The pair of seat rails 24 support the seat 8 from below. The pair of support rails 25 are connected to the pivot frames 18 below the seat rails 24, respectively. The pair of support rails 25 extend rearward and upward from the pivot frames 18 and are connected to the seat rails 24.

The vehicle body frame 5 is a semi-double cradle type. The vehicle body frame 5 is provided, and the power unit 7 including the motor 50 and a battery 100 is mounted on the vehicle body frame 5 in front of the left and right pivot frames 18 and below the left and right main frames 17 behind the head pipe 16. The vehicle body frame 5 surrounds the power unit 7 with the single down frame 19 and the left and right lower frames 20 from the front and below.

The rear wheel suspension system 6 includes a swing arm 30 configured to axially support the rear wheel 3 on a rear end portion thereof, a link mechanism 31 connected to a front section of the swing arm 30 and lower sections of the pair of pivot frames 18, and the rear cushion 32 that bridges the link mechanism 31 and the cross member 22.

The swing arm 30 is provided below the rear section of the vehicle body. The swing arm 30 extends forward and rearward. A front end portion of the swing arm 30 is formed in a bifurcated shape branching off leftward and rightward, and vertically swingably supported by the pair of pivot frames 18 via the pivot shaft 33.

The link mechanism 31 has the link arm 34 and a link member 35. The link arm 34 is provided below the swing arm 30 when seen in a side view. The link arm 34 extends forward and rearward. A front end portion of the link arm 34 is pivotably connected to the link support bracket 23*a* of the lower cross member 23. The link member 35 is formed in a triangular shape when seen in a side view. An upper section of the link member 35 is pivotably connected to a longitudinal intermediate section of the swing arm 30. A rear lower section of the link member 35 is pivotably connected to a rear end portion of the link arm 34. The rear cushion 32 is connected to a front section of the link member 35.

The rear cushion 32 is provided on a vehicle width center of the rear section of the vehicle body. The rear cushion 32 is formed in a tubular shape, and extends upward and downward in the axial direction (the longitudinal direction) inclined forward. An upper end portion of the rear cushion 32 is pivotably connected to the cushion support bracket 22*a* of the cross member 22. A lower end portion of the rear cushion 32 is pivotably connected to a front section of the link member 35.

As shown in FIG. 2, the power unit 7 includes the motor 50 for driving the vehicle, a reduction gear 60 configured to reduce a speed of an output of the motor 50, an output shaft 70 configured to output power of the motor 50 in which the speed thereof has been reduced in the reduction gear 60, the battery 100 that is a power supply of the motor 50, a power control unit (PCU) 130 configured to control the motor 50, a drive section of the motor 50 and the reduction gear 60, the housing 80 configured to accommodate the PCU 130, and a high voltage electric wire 120 extending from the battery 100 and connected to the PCU 130. The power unit 7 is fixedly supported by the vehicle body frame 5. The power unit 7 is disposed behind the down frame 19 and above the lower frames 20 when seen in a side view. In addition, the power unit 7 is disposed to be sandwiched between the pair of main frames 17 and the pair of pivot frames 18 from sides outward therefrom in the vehicle width direction. A lower section of the power unit 7 is covered with an undercover 27 attached to the lower frames 20 (see FIG. 1).

The motor 50, the reduction gear 60, the output shaft 70, the PCU 130 and a housing 80 are integrally unitized as a drive apparatus 7*a*. The motor 50 is disposed on a rear section of the power unit 7. The reduction gear 60 is disposed on an outward side (a right side) outward than the motor 50 in the vehicle width direction. The PCU 130 is disposed below the motor 50. The housing 80 forms an outer shell of the drive apparatus 7*a*.

Figure 3:
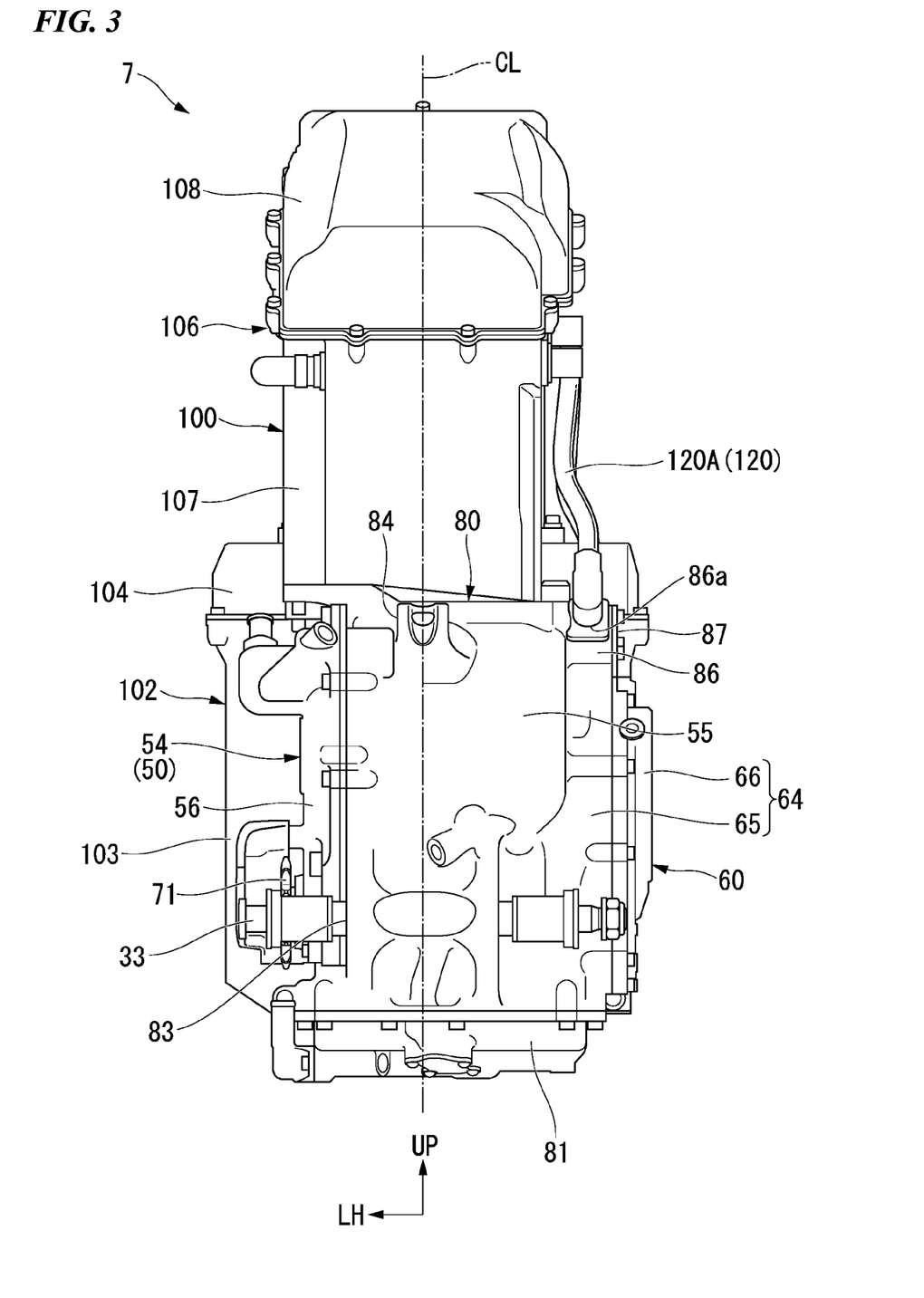
FIG. 3 is a rear view of a power unit of the embodiment.

The motor 50 is disposed on a vehicle width center CL (see FIG. 3). The vehicle width center CL is a virtual line overlapping a central axis of the head pipe 16 when seen in the forward/rearward direction. The motor 50 includes a stator and a rotor, which are not shown, and a motor case 54 configured to accommodate the stator and the rotor. The rotor is rotatably provided around the axis extending in the vehicle width direction. A motor shaft (not shown) extending in the vehicle width direction is fixed to the rotor. The motor shaft is rotated integrally with the rotor.

FIG. 3 is a rear view of a power unit of the embodiment.

As shown in FIG. 2 and FIG. 3, the motor case 54 is a part of the housing 80, and forms an outer shell of the motor 50. The motor case 54 is formed in a tubular shape coaxial with the stator and the rotor, both ends of which are closed. The motor case 54 includes a motor case main body 55 formed to cover the stator and the rotor from an outward side and a right side in the radial direction and opening leftward and rightward, and a motor cover 56 configured to close the opening of the motor case main body 55 on the left side. The motor cover 56 is formed to cover the stator and the rotor from the left side.

As shown in FIG. 2, the reduction gear 60 includes a drive gear 61 fixed to a motor shaft (not shown) of the motor 50, a reduction gear 62 that is a two-speed gear meshed with the drive gear 61, a driven gear 63 fixed to the output shaft 70 and meshed with the reduction gear 62, and a reduction gear case 64 configured to accommodate the drive gear 61, the reduction gear 62 and the driven gear 63.

As shown in FIG. 2 and FIG. 3, the reduction gear case 64 is a part of the housing 80, and forms an outer shell of the reduction gear 60. The reduction gear case 64 is disposed on the right side of the motor case 54. The reduction gear case 64 protrudes outward from the motor case 54 in the vehicle width direction. The reduction gear case 64 is provided behind a front end of the housing 80. The reduction gear case 64 includes a reduction gear case main body 65 formed to cover the drive gear 61, the reduction gear 62 and the driven gear 63 from the forward/rearward direction and the upward/downward direction and that opens rightward, and a reduction gear cover 66 configured to cover the opening of the reduction gear case main body 65 on the right side. The reduction gear case main body 65 is formed integrally with the motor case main body 55. That is, a longitudinal wall of the reduction gear case main body 65 on the left side is integrated with a longitudinal wall of the motor case main body 55 on the right side. The reduction gear cover 66 forms an external form of the reduction gear case 64 when seen from the vehicle width direction. The reduction gear cover 66 is formed to cover the drive gear 61, the reduction gear 62 and the driven gear 63 from the right side.

As shown in FIG. 2, the output shaft 70 is disposed below and behind the motor 50. The output shaft 70 extends in the vehicle width direction and is rotatably supported by the housing 80. The above-mentioned driven gear 63 is fixed to a right end of the output shaft 70. A front sprocket 71 (see FIG. 1) is fixed to a left end of the output shaft 70. As shown in FIG. 1, the front sprocket 71 is disposed on an outward side of the housing 80. A chain 77 of a transmission mechanism disposed on the left side of the rear section of the vehicle body is wound on the front sprocket 71. The chain 77 is wound around a rear sprocket of the rear wheel 3 on the left side. Accordingly, an output of the motor 50 is transmitted to the rear wheel 3.

As shown in FIG. 2, the housing 80 includes a PCU case 81 configured to accommodate the PCU 130 and a cable case 82 configured to cover the high voltage electric wire 120, in addition to the motor case 54 and the reduction gear case 64. The PCU case 81 is disposed below the motor case 54. The PCU case 81 is formed in a rectangular parallelepiped shape extending in the upward/downward direction, the forward/rearward direction and the vehicle width direction (see also FIG. 3). The PCU case 81 has a cavity therein, and the PCU 130 is accommodated in the cavity. The PCU case 81 protrudes forward than the motor case 54.

The cable case 82 will be described below.

The housing 80 includes a lower support section 83 and an upper support section 84 supported by the vehicle body frame 5. The lower support section 83 protrudes rearward from a rear lower section of the housing 80. A through-hole through which the pivot shaft 33 is inserted is formed in the lower support section 83. The lower support section 83 is supported by the pivot frames 18 via the pivot shaft 33 while being sandwiched between bifurcated front end portions of the swing arm 30 (see FIG. 1) from both sides in the vehicle width direction on the pivot shaft 33.

The upper support section 84 protrudes rearward and upward from the rear upper section of the housing 80. The upper support section 84 is supported by the cross member 22 via a pair of left and right first mount brackets 45.

The battery 100 is disposed on a front section and an upper section of the power unit 7. The battery 100 is disposed in front of and above the motor 50. The battery 100 includes a lower battery 102 and an upper battery 106. The lower battery 102 and the upper battery 106 are fastened to each other.

Figure 4:
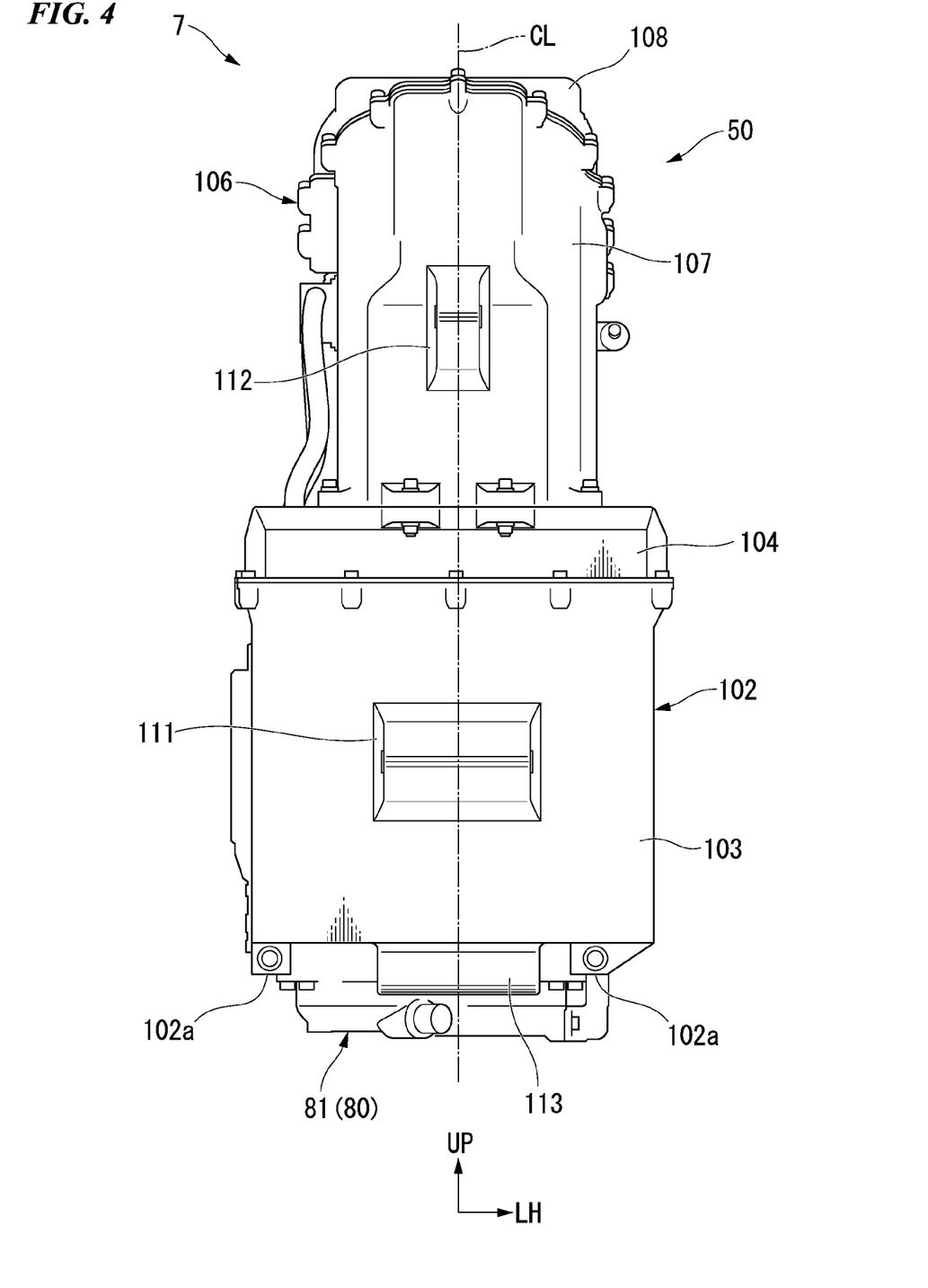
FIG. 4 is a front view of the power unit of the embodiment.
Figure 5:
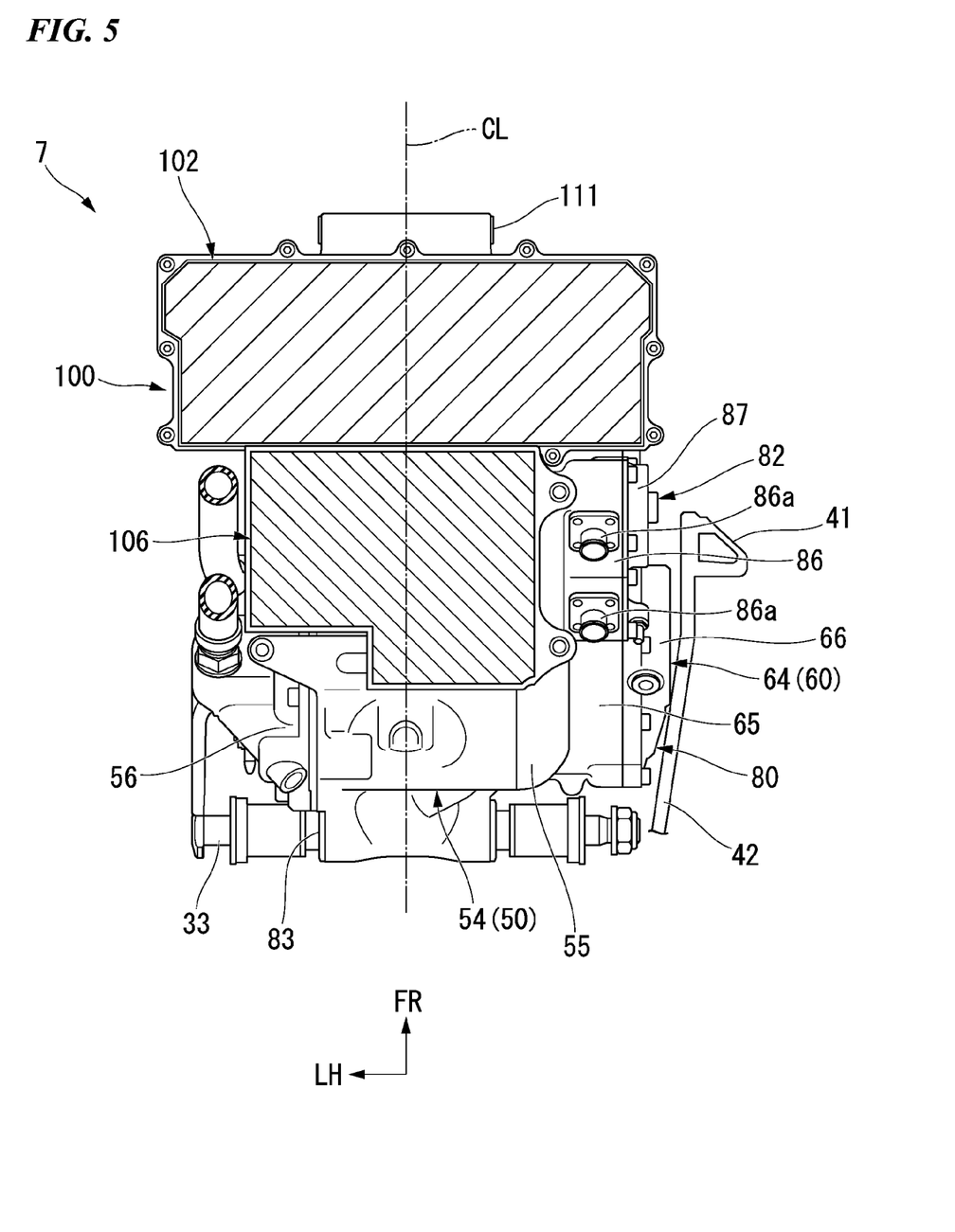
FIG. 5 is a cross-sectional view taken along line V-V in FIG. 2.

FIG. 4 is a front view of the power unit of the embodiment. FIG. 5 is a cross-sectional view taken along line V-V in FIG. 2.

As shown in FIG. 2, FIG. 4 and FIG. 5, the lower battery 102 is disposed in front of the motor 50. The lower battery 102 is formed in a rectangular parallelepiped shape in the upward/downward direction, the forward/rearward direction and the vehicle width direction. The lower battery 102 is disposed to overlap the vehicle width center CL when seen from the forward/rearward direction. The lower battery 102 is formed to be larger than the motor 50 in the vehicle width direction. The lower battery 102 protrudes than the motor 50 at both sides in the vehicle width direction.

A right section of the lower battery 102 is disposed at an interval with respect to the reduction gear 60 in the forward/rearward direction. Accordingly, a gap in the forward/rearward direction is formed between the lower battery 102 and the reduction gear 60. The lower battery 102 protrudes to a position inward in the vehicle width direction than the reduction gear 60. In other words, a right end of the lower battery 102 is disposed inward (leftward) in the vehicle width direction than the right end of the reduction gear case 64. The lower battery 102 protrudes upward than the housing 80.

As shown in FIG. 2, a casing of the lower battery 102 is formed to be divided into upper and lower sides along a virtual plane extending in a substantially horizontal direction, a lower section configures a case main body 103 and an upper section configures a lid body 104. The case main body 103 and the lid body 104 are fixed to each other by a plurality of fasteners configured to fasten opening edges, respectively.

A pair of left and right leg sections 102a fastened to the housing 80 are provided on a lower end portion of the lower battery 102. The pair of leg sections 102a are provided to protrude downward. The pair of leg sections 102a are disposed to sandwich an upper section of a front end portion of the PCU case 81 from an outward side in the vehicle width direction. The pair of leg sections 102a are fastened to a fastening seat 81a protruding outward from the PCU case 81 in the vehicle width direction from the front.

The upper battery 106 is disposed above the motor 50 and the lower battery 102.

The upper battery 106 is disposed between the pair of main frames 17. The upper battery 106 is disposed between the pair of gussets 21 (see FIG. 1). The upper battery 106 is formed to be larger than the lower battery 102 in the forward/rearward direction.

As shown in FIG. 4, the upper battery 106 is disposed to overlap the vehicle width center CL when seen from the forward/rearward direction. The upper battery 106 extends in the upward/downward direction with a substantially constant width when seen from the forward/rearward direction. The upper battery 106 is formed to be smaller than the lower battery 102 in the vehicle width direction. Accordingly, the lower battery 102 protrudes than the upper battery 106 toward both sides in the vehicle width direction.

As shown in FIG. 2, a front section of the upper battery 106 is disposed above the lower battery 102. A lower surface of the front section of the upper battery 106 is adhered to an upper surface of the lid body 104 of the lower battery 102. The rear section of the upper battery 106 is disposed above the motor 50. The rear section of the upper battery 106 protrudes downward than the front section of the upper battery 106. A front surface of a lower end portion of the rear section of the upper battery 106 is adhered to a rear surface of the lid body 104 of the lower battery 102. A lower surface of the rear section of the upper battery 106 is provided along an upper surface of the motor case 54. A rear surface of the upper battery 106 is formed in a stepped shape such that the lower section is disposed in front of the upper section to avoid the cross member 22. The upper section of the front surface of the upper battery 106 swells forward. The lower section of the front surface of the upper battery 106 extends along the same plane as the front surface of the lower battery 102. The upper surface of the upper battery 106 extends in a substantially horizontal direction from the front toward the rear, and then, extends downward obliquely.

A casing of the upper battery 106 is formed to be divided into upper and lower sides along a virtual plane extending rearward and downward from an upper front end portion thereof, and an upper section constitutes a lid body 108 while a lower section constitutes a case main body 107. The entire lid body 108 is disposed above the pair of main frames 17. The case main body 107 and the lid body 108 are fixed to each other by a plurality of fasteners configured to fasten opening edges thereof.

The front section of the upper battery 106 is fastened to the lid body 104 of the lower battery 102. The rear section of the upper battery 106 is fastened to the upper section of the motor case 54 and the rear upper section of the lower battery 102.

The battery 100 includes a support section 111 under the front surface, a support section 112 on the front surface and a lower surface support section 113, which are supported by the vehicle body frame 5.

The support section 111 under the front surface extends in the vehicle width direction while protruding forward from the front surface of the lower battery 102. The support section 111 under the front surface is supported by the down frame 19 via a pair of left and right second mount brackets 46. The pair of second mount brackets 46 are disposed to sandwich the support section 111 under the front surface from an outward side in the vehicle width direction, and fastened to the support section 111 under the front surface. Further, the pair of second mount brackets 46 are fastened to the down frame 19.

The support section 112 on the front surface extends in the vehicle width direction while protruding forward from the front surface of the upper battery 106. The support section 112 on the front surface is supported by the down frame 19 via a pair of left and right third mount brackets 47. The pair of third mount brackets 47 are disposed to sandwich the support section 112 on the front surface from an outward side in the vehicle width direction, and connected to the support section 112 on the front surface. Further, the pair of third mount brackets 47 are fastened to the down frame 19.

The lower surface support section 113 extends in the vehicle width direction while protruding downward from the lower surface of the lower battery 102. The lower surface support section 113 is sandwiched by a pair of extension sections 20a protruding from the pair of lower frames 20 from an outward side in the vehicle width direction. The lower surface support section 113 is fastened to the pair of extension sections 20a. Accordingly, the lower surface support section 113 is supported by the lower frames 20.

The PCU 130 is a control device including a power drive unit (PDU) that is a motor driver, an electric control unit (ECU) configured to control the PDU, or the like. The PDU includes an inverter, converts direct current supplied from the battery 100 into alternating current, and then, supplies the alternating current to the motor 50. The PCU 130 is accommodated in the PCU case 81 of the housing 80.

The high voltage electric wire 120 is disposed on the same side as the reduction gear 60 (i.e., the right side) with respect to the vehicle width center CL. The high voltage electric wire 120 is disposed to overlap the battery 100 or the motor 50 when seen from the vehicle width direction. The high voltage electric wire 120 extends from a right side surface of the rear section of the upper battery 106. The high voltage electric wire 120 extends from the upper section of the case main body 107 of the upper battery 106. The high voltage electric wire 120 extends along outer surfaces of the motor 50 and the upper battery 106. The high voltage electric wire 120 extends such that at least a part thereof is provided toward the PCU 130 disposed below the upper battery 106 in the upward/downward direction. The high voltage electric wire 120 is disposed above the brake pedal 41. At least a part of the high voltage electric wire 120 is disposed straight above the brake pedal 41 when seen from the vehicle width direction.

The high voltage electric wire 120 includes a first high voltage electric wire 120A connected to one terminal of the battery 100, and a second high voltage electric wire 120B connected to the other terminal of the battery 100. The first high voltage electric wire 120A and the second high voltage electric wire 120B are disposed so as not to overlap each other when seen from the vehicle width direction at least at a position that overlaps with the upper battery 106 when seen from the vehicle width direction. The high voltage electric wire 120 is disposed in a gap between the reduction gear 60 and the lower battery 102 in the forward/rearward direction at a position overlapping the motor 50 when seen in the vehicle width direction. The first high voltage electric wire 120A and the second high voltage electric wire 120B is disposed so as to overlap each other when seen from the vehicle width direction at a position overlapping the motor 50 when seen from the vehicle width direction.

The high voltage electric wire 120 is covered with the cable case 82 at a position overlapping the motor 50 when seen from the vehicle width direction. The cable case 82 is disposed in a gap between the reduction gear case 64 and the lower battery 102 in the forward/rearward direction. The cable case 82 includes a circumferential wall section 86 (see FIG. 3 and FIG. 5) configured to surround the high voltage electric wire 120 from a direction except both sides in the vehicle width direction, and a cable cover 87 configured to cover an opening of the circumferential wall section 86 on an outward side in the vehicle width direction.

As shown in FIG. 5, an opening of the circumferential wall section 86 on an inward side in the vehicle width direction is covered with a longitudinal wall of the motor case main body 55 on the right side. The circumferential wall section 86 extends from the motor case main body 55. For example, the circumferential wall section 86 is provided integrally with the motor case main body 55. Further, a part of the circumferential wall section 86 may be provided integrally with the reduction gear case main body 65.

As shown in FIG. 2 and FIG. 5, a pair of electric wire introduction sections 86a configured to introduce the high voltage electric wire 120 into the cable case 82 from outside the cable case 82 are formed in the upper section of the circumferential wall section 86. The pair of electric wire introduction sections 86a are provided parallel to the forward/rearward direction. The electric wire introduction sections 86a open upward and rearward. The cable cover 87 forms an external form of the cable case 82 when seen from the vehicle width direction. The cable cover 87 is formed to cover the high voltage electric wire 120 in the circumferential wall section 86 from an outward side (a right side) in the vehicle width direction. The cable cover 87 is fastened to an opening edge of the circumferential wall section 86 on the outward side in the vehicle width direction.

The cable case 82 is disposed inward in the vehicle width direction than an outer end of the lower battery 102 in the vehicle width direction and an outer end of the reduction gear 60 in the vehicle width direction. In addition, the cable case 82 is disposed above a lower end of the battery 100 and a lower end of the reduction gear 60. The cable case 82 is disposed above the brake pedal 41 and inside in the vehicle width direction. The high voltage electric wire 120 is disposed in the cable case 82 to be oriented in a substantially upward/downward direction. The substantially upward/downward direction is, for example, a direction in which an inclination angle with respect to a vertical direction is 45 degrees or less when seen from the vehicle width direction. The high voltage electric wire 120 enters the PCU case 81 from the inside of the cable case 82 in the lower section of the cable case 82.

As described above, the electric bicycle 1 of the embodiment includes the high voltage electric wire 120 extending from the battery 100, and the high voltage electric wire 120 is disposed in a gap between the reduction gear 60 and the battery 100 in the forward/rearward direction outside the motor 50 in the vehicle width direction. According to the configuration, since the high voltage electric wire 120 is disposed in the gap between the reduction gear 60 and the battery 100, which is a dead space, reduction in size of the vehicle can be achieved. In addition, since the high voltage electric wire 120 is disposed to be sandwiched between the reduction gear 60 and the battery 100, the high voltage electric wire 120 can be protected from a stepping stone due to the reduction gear 60 and the battery 100. Accordingly, it is possible to provide the electric bicycle 1 in which protection of the high voltage electric wire 120 and reduction in size of the vehicle are achieved.

In addition, an outer end of the cable case 82 in the vehicle width direction is disposed inward in the vehicle width direction than an outer end of the reduction gear 60 in the vehicle width direction. According to the configuration, it is possible to cause the reduction gear 60 to come into contact with a substance that approaches the cable case 82 from an outward side in the vehicle width direction prior to the cable case 82. For example, when the vehicle falls or the like, the reduction gear 60 comes into contact with the ground surface prior to the cable case 82. Accordingly, it is possible to improve protective performance of the high voltage electric wire 120 covered with the cable case 82.

In addition, the PCU 130 including the inverter is disposed below the motor 50, and the high voltage electric wire 120 is disposed to be oriented in the substantially upward/downward direction and connected to the PCU 130. According to the configuration, the high voltage electric wire 120 can be disposed toward the PCU 130 below the motor 50 outside the motor 50 in the vehicle width direction with no bypassing. Accordingly, in comparison with the case in which the high voltage electric wire is disposed to be oriented in the horizontal direction outside the motor 50 in the vehicle width direction, the high voltage electric wire 120 is provided to have a short length and reduction in size of the vehicle can be achieved.

In addition, at least parts of the first high voltage electric wire 120A and the second high voltage electric wire 120B overlap each other in a gap in a direction between the reduction gear 60 and the battery 100 when seen from the vehicle width direction.

According to the configuration, even when the gap between the reduction gear 60 and the battery 100 in the forward/rearward direction is narrow, the high voltage electric wire 120 can be disposed in the gap between the reduction gear 60 and the battery 100. Accordingly, reduction in size of the vehicle can be achieved.

In addition, the high voltage electric wire 120 is disposed above the brake pedal 41 when seen from the vehicle width direction, and the outer end of the cable case 82 in the vehicle width direction is disposed inside the brake pedal 41 in the vehicle width direction. According to the configuration, it is possible to cause the brake pedal 41 to come into contact with a substance that approaches the cable case 82 from an outward side in the vehicle width direction prior to the cable case 82. For example, when the vehicle falls or the like, the brake pedal 41 comes into contact with the ground surface prior to the cable case 82. Accordingly, it is possible to improve protective performance of the high voltage electric wire 120 covered with the cable case 82.

In addition, the cable case 82 is disposed above the brake pedal 41. According to the configuration, it is possible to cause the brake pedal 41 to come into contact with the substance that approaches the cable case 82 from below prior to the cable case 82. For example, when the vehicle gets over a step or the like, the brake pedal 41 comes into contact with the step prior to the cable case 82.

Accordingly, it is possible to improve protective performance of the high voltage electric wire 120 covered with the cable case 82.

Further, the present invention is not limited to the above-mentioned embodiment described with reference to the accompanying drawings, and various variants are considered without departing from the technical scope of the present invention.

For example, in the embodiment, while application to the electric bicycle for offroad traveling has been exemplarily described, there is no limitation to use of the vehicle.

For example, all vehicles on which a driver rides on the vehicle body are included as the saddle-type electric vehicle, and in addition to a motorcycle, a three-wheeled vehicle (including a two-front-wheeled and one-rear-wheeled vehicle in addition to one-front-wheeled and two-rear-wheeled vehicle) is also included.

In addition, in the embodiment, while the motor case 54, the reduction gear case 64 and the cable case 82 are provided integrally as a part of the housing 80, there is no limitation thereto and they may be provided as separate members.

In addition, in the embodiment, while the battery 100 includes the lower battery 102 and the upper battery 106, there is no limitation thereto. The battery may be disposed in front of and above the motor 50, and for example, casings of the lower battery 102 and the upper battery 106 of the embodiment may be integrated.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A saddle-type electric vehicle comprising:
a battery;
a high voltage electric wire extending from the battery;
a motor driven by electricity supplied from the battery; and
a reduction gear configured to reduce a speed of an output of the motor,
wherein the battery is disposed in front of and above the motor,
the reduction gear is disposed outside the motor in a vehicle width direction, and
the high voltage electric wire is disposed in a gap between the reduction gear and the battery in a forward/rearward direction at outer side of the motor in the vehicle width direction.

2. The saddle-type electric vehicle according to claim 1, further comprising: a case configured to cover the high voltage electric wire,
wherein an outer end of the case in the vehicle width direction is disposed inward in the vehicle width direction than an outer end of the reduction gear in the vehicle width direction.

3. The saddle-type electric vehicle according to claim 1, further comprising an inverter configured to convert current supplied from the battery into alternating current and to supply the alternating current to the motor,
wherein the inverter is disposed below the motor, and
the high voltage electric wire is disposed to be oriented in a substantially upward/downward direction and is connected to the inverter.

4. The saddle-type electric vehicle according to claim 1, wherein the high voltage electric wire comprises a first high voltage electric wire and a second high voltage electric wire, and
at least parts of the first high voltage electric wire and the second high voltage electric wire overlap each other when seen from the vehicle width direction in the gap between the reduction gear and the battery in the forward/rearward direction.

5. The saddle-type electric vehicle according to claim 1, comprising a case configured to cover the high voltage electric wire,
wherein the high voltage electric wire is disposed above a brake pedal when seen from the vehicle width direction, and
an outer end of the case in the vehicle width direction is disposed inward in the vehicle width direction than the brake pedal.

* * * * *